Figure 1:
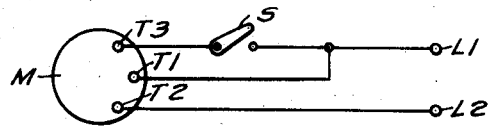

WITNESSES:
E. A. McCloskey.

INVENTOR
Frederick D. Snyder.
BY
Paul E. Friedemann
ATTORNEY

Patented July 22, 1947

2,424,337

UNITED STATES PATENT OFFICE 2,424,337

REVERSIBLE ELECTRIC MOTOR

Frederick D. Snyder, Milton, Mass., assignor to Westinghouse Electric Corporation, East Pittsburgh, Pa., a corporation of Pennsylvania Application December 8, 1944, Serial No. 567,257

3 Claims. (Cl. 172—239)

My invention relates to control circuits for reversing the operation of direct-current motors and, more especially, to reversing control circuits for small-size motors, such as fractional horsepower motors.

It is an object of my invention to provide an electric drive, in which the running direction of the drive motor is controlled merely by the opening or closing of a single-pole single-throw switch.

Another object subsidiary to the foregoing is to devise the reversing circuit in such a manner that despite the use of a single pole switch the customary number of three motor terminals or in-leads is retained.

Another object of my invention, also allied to those mentioned above, is to provide a system in which the single-pole make and break switch is arranged in the field connections of the motor in such a manner that the armature circuit is not interrupted during the reversing operation, and that the field connections are likewise never separated from the energizing leads so as to prevent arcing or sparking tendencies at the control switch.

A further object in conjunction with the foregoing is to devise a reversing control system of simple design which secures an especially rapid reversal of the motor.

In order to achieve these objects and in accordance with my invention, I provide each pole structure of the drive motor with two field windings arranged for magnetizing the structure with different magnetic polarities, respectively. That is, one of the two windings of each pole structure, when energized, tends to make the pole face of this structure a north pole, while the other winding has the tendency of making the same pole face a south pole. All field windings are connected between the two in-leads or terminals that supply the motor armature with excitation. The connection of the field windings with these leads or terminals is so chosen that two field windings located on opposite pole structures and having different magnetic polarities are interconnected in series relation to each other, while the remaining two field windings of the same two pole structures are interconnected in parallel relation to each other. A single-pole make and break switch is also connected between the two armature in-leads. This switch is arranged to render two interconnected field windings inoperative depending upon whether the switch is open or closed; and the ampere turns of the field windings are so rated that the resultant or effective polarity of each pole structure depends on the selected position of the switch.

According to another feature of my invention, the above-mentioned interconnections between the four field windings are so chosen that three of them extend serially across the two energizing leads, while the fourth field winding lies in parallel to that one of the three series connected windings which has a different polarity and lies on a different field structure as compared with the fourth winding. In conjunction therewith, the single-pole switch is connected across either one of the two above-mentioned pairs of interconnected windings.

Figure 2:
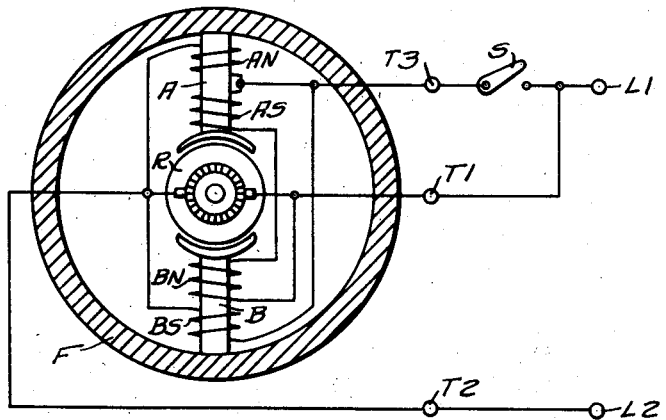
Figure 3:
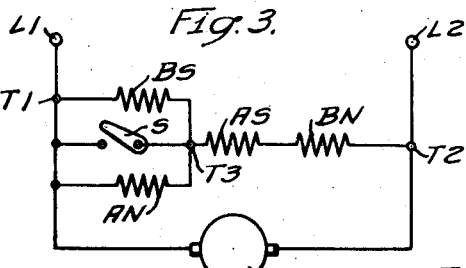

The invention will be more fully understood from the following description of the embodiment illustrated in the drawing, in which:

Figure 1 shows a schematic diagram of the external motor connections, and Figs. 2 and 3 show two different embodiments of the complete circuit connections applicable in an arrangement according to Fig. 1 and designed in accordance with the invention.

Referring to Figure 1, the illustrated motor M is intended to be a fractional horsepower motor. This motor has three terminals T1, T2, and T3 representing its only external points of attachment to the necessary current source as well as to the contactor equipment of the appertaining reversing control system. The only contactor needed for a control system, according to the invention, is a single-pole make and break switch, as represented at S in Fig. 1. Only two terminal points, L1 and L2, are required for connecting the drive system to the power source. The direction of rotation of motor M depends on whether switch S is open or closed.

According to the more detailed showing in Fig. 2, the motor M has its stator frame F provided with two pole structures A and B which, according to Fig. 2, are each provided with two field windings. Structure A carries a winding AN for producing a north pole at the pole surface which faces the armature R of the motor, and is also equipped with a winding AS tending, when energized, to make the pole surface of structure A a south pole. Similarly, the opposite pole structure B has two windings BN and BS for producing north and south pole magnetization, respectively.

All four field windings, as well as the switch S, are connected across the two in-leads or terminals L1, L2, that provide excitation for the motor armature R. Windings AS and BN appertaining to different pole structures and having different polarities, are arranged in series relation to each other. Windings AN and BS, also having different polarities and being located on different pole structures, are interconnected in parallel relation to each other. Switch S is attached between the motor terminals T3 and T1, and hence lies in a short-circuit path across the series connection of windings AS and BN. When the switch S is open, all four field windings are energized. Hence, the polarity of each pole structure is then dependent upon the resultant magnetization produced by both of its two field windings. The windings are so rated that the ampere turns of windings AS and BN exceed those of windings AN and BS respectively. Consequently, with switch S open, pole structure A forms a south pole, while structure B represents a north pole. When switch S is closed, the two windings AS and BN are short-circuited and hence ineffective. Now, only winding AN on pole structure A is excited, and hence produces a north pole, while winding BS causes the structure B to develop a south pole. In this manner, the position of switch S determines the polarity of the motor field poles and, therefore, the running direction of the motor armature.

If it is desired to obtain the same speed in both operating directions, the four field windings of the motor must be rated in accordance with the following chart:

| Field Winding | Turns | Resistance |
|---|---|---|
| AN (North Pole) | X | 4Y |
| BS (South Pole) | X | 4Y |
| AS (South Pole) | 1.5X | Y |
| BN (North Pole) | 1.5X | Y |

With switch S closed, pole A will be north pole with a strength of $$\left(X \text{ turns times } \frac{\text{volts}}{4Y}\right)$$

or $$\frac{X \text{ volts}}{4Y}$$

When switch S is open, pole A will have both windings energized. The north pole winding will have a strength of $$\left(X \text{ turns times } \frac{\text{volts}}{4Y} \text{ times } \tfrac{1}{2}\right)$$

or $$\frac{X \text{ volts}}{8Y}$$

The south pole winding will have a strength of $$\left(1.5X \text{ turns times } \frac{\text{volts}}{4Y}\right)$$

or $$\frac{3X \text{ volts}}{8Y}$$

The net result will be a south pole equal to $$\frac{3X \text{ volts}}{8Y} - \frac{X \text{ volts}}{8Y}$$

ampere turns which is exactly the same field strength that this pole had as a north pole with switch S closed.

The embodiment of the invention shown in Fig. 3 by a straight line representation is similar to the above-described embodiment of Fig. 2, except that switch S is not connected across the series group of windings AS and BN but lies across the parallel group of windings AN and BS. With switch S open, the field of winding AN and BS predominates so that poles A and B are north and south poles, respectively. With switch S closed, windings AS and BN are alone effective so that poles A and B have reversed polarity.

Control circuits of the type described in the foregoing are not only extremely simple, but provide also a rapid reversal of the motor, brought about chiefly by the fact that the armature circuit is never opened during the reversing control operation. The illustrated control systems have the further advantage that switch S never opens the circuits of any of the field windings. Consequently, the duty imposed on this switch is extremely light and there is no appreciable tendency of arcing or sparking at the switch contact. If necessary, such tendency can be fully eliminated by connecting a capacitor across the switch gap.

The invention is advantageous for various applications of reversible motors to be used in commercial or domestic appliances. For instance, in duplicating machines, the motor runs normally in the same direction; but, when a new master form or wax stencil is to be inserted, the motor must be reversed temporarily before it resumes its normal operation. In machines of this and other types with relatively small electric motors, the possibility afforded by the invention of providing a reversing control with exceedingly simple means and without complication as regards the installation of the control means represents a considerable improvement as compared with the more complicated devices heretofore customary for similar purposes.

I claim as my invention:

1. A reversible electric drive comprising a direct-current motor having an armature and two magnetic pole structures, two leads connected to said armature for supplying current thereto, two field windings of opposite polarity disposed on each of said structures, three of said windings being connected in series relation to one another across said two leads, said remaining winding being connected in parallel to one of said three windings, a single-pole make and break switch connected in parallel to the series connection of the remaining two of said three windings for selectively opening and closing a short-circuit across said latter two windings, and said two windings on each of said structures having different ratings so that the effective polarity of each structure is reversed by actuating said switch.

2. A reversible electric drive comprising a direct-current motor having an armature and two magnetic pole structures, two leads connected to said armature for supplying current thereto, two field windings of opposite polarity disposed on each of said structures, the winding of one polarity on one of said structures having lower ampere turns than the winding of the same polarity on the other structure, and the winding of the other polarity on said one structure having higher ampere turns than the remaining winding on said other structure, three of said windings being connected in series relation to one another across said two leads, said remaining winding being connected in parallel to the one of said three series connected windings that appertains to the pole structure different from that of said remaining winding and has different polarity, and make and break contact means connected across the two of said three series connected windings that have different polarities and lie on different pole structures so as to permit opening and closing a short-circuit path across said latter two windings in order to thereby reverse the effective polarity of said pole structures.

3. A reversible electric drive comprising a direct-current motor having an armature and two magnetic pole structures, two leads connected to said armature for supplying current thereto, two field windings of opposite polarity disposed on each of said structures, said windings being all connected between said two leads so that two windings of opposite polarity of said respective structures are interconnected in parallel relation to each other while said remaining two windings are interconnected in series relation to each other, and a single-pole make and break switch connected to said windings between said two leads so as to lie in series with said parallel connected windings and in parallel to said series connected windings to permit opening and closing a short-circuit path across said series connected windings without interrupting the connection of said four windings to said two leads, said windings being rated respectively to produce opposite polarities respectively of said pole structures depending on the position of said switch.

FREDERICK D. SNYDER.

REFERENCES CITED

The following references are of record in the file of this patent:

UNITED STATES PATENTS

| Number | Name | Date |
| --- | --- | --- |
| 921,299 | Sprong et al. | May 11, 1909 |
| 960,734 | Thomson | June 7, 1910 |
| 1,966,170 | Greene | July 10, 1934 |
| 337,793 | Sprague | Mar. 9, 1886 |
| 370,000 | Wheeler | Sept. 13, 1887 |